(12) United States Patent
Kao et al.

(10) Patent No.: US 7,398,404 B2
(45) Date of Patent: Jul. 8, 2008

(54) SYSTEM AND RELATED CONTROL DEVICE AND METHOD FOR CONTROLLING POWER SUPPLY ACCORDING TO A POWER STATUS

(75) Inventors: Yi-Sheng Kao, Taipei Hsien (TW); Chih-Ching Chan, Taipei Hsien (TW); Tung-Sheng Yeh, Taipei Hsien (TW); Chun-Yen Lin, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 491 days.

(21) Appl. No.: 11/163,886

(22) Filed: Nov. 2, 2005

(65) Prior Publication Data

US 2007/0076777 A1   Apr. 5, 2007

(30) Foreign Application Priority Data

Sep. 30, 2005   (TW) .............................. 94134226 A

(51) Int. Cl.
*G06F 1/26* (2006.01)
(52) U.S. Cl. .................. 713/320; 713/300; 372/101
(58) Field of Classification Search ................. 713/300, 713/320; 372/101
See application file for complete search history.

(56) References Cited

U.S. PATENT DOCUMENTS

| | | | | |
|---|---|---|---|---|
| 6,151,652 A | * | 11/2000 | Kondo et al. ................. | 713/300 |
| 6,249,167 B1 | * | 6/2001 | Oguchi et al. ............... | 327/291 |
| 6,619,774 B1 | * | 9/2003 | Kawai et al. .................. | 347/2 |
| 6,841,898 B2 | * | 1/2005 | Moran .......................... | 307/80 |
| 6,894,405 B2 | * | 5/2005 | Yuan ............................ | 307/45 |
| 6,920,573 B2 | * | 7/2005 | Lee .............................. | 713/323 |
| 2005/0091547 A1 | * | 4/2005 | Hanrieder et al. ........... | 713/310 |
| 2007/0018502 A1 | * | 1/2007 | Bazinet ....................... | 307/80 |

* cited by examiner

*Primary Examiner*—Thomas Lee
*Assistant Examiner*—Vincent T Tran
(74) *Attorney, Agent, or Firm*—Winston Hsu

(57) ABSTRACT

A computer system includes a main power, a backup power, an input/output (I/O) board, a main board, a computer host, and controls signal transmission and signal detection with a control device. The control device controls the main power and the backup power according to a power status. When one of the main power or the backup power fails, the control device controls the other functioning power to supply power to the I/O board and the main board and prevents the computer system from shutting down.

12 Claims, 6 Drawing Sheets

SYSTEM AND RELATED CONTROL DEVICE AND METHOD FOR CONTROLLING POWER SUPPLY ACCORDING TO A POWER STATUS

BACKGROUND OF THE INVENTION

1. Field of the Invention

The present invention relates to a computer system and a related control device, and more particularly, to a computer system and a related control device which controls power supply based on a power status.

2. Description of the Prior Art

In the information era when computers can be found in almost every household, desktop computers can no longer satisfy the growing requirement by most users. As lightness, mobility and convenience is required, notebook computers, personal digital assistants (PDAs), cellular phones, and other mobile electronic devices have become more and more popular. For such mobile electronic devices, a steady and lasting power supply is one of the most important features.

Please refer to FIG. 1 for a diagram of a prior art computer system 10 including a power supply. The computer system 10 includes a main power 11, a backup power 12, an input/output board (I/O board) 13, and a computer host 14. The computer host 14 can be coupled to a connecting end 15 of the I/O board 13 via a connecting end 16. When the connecting end 16 of the computer host 14 is electrically isolated from the connecting end 15 of the I/O board 13, the backup power 12 supplies power to the computer host 14 and the main power 11 supplies power to the I/O board 13. When the connecting end of the computer host 14 is electrically connected to the connecting end 15 of the I/O board 13, the main power 11 supplies power to the I/O board 13 and to the computer host 14 through the connecting ends 15 and 16, while the backup power 12 does not supply power.

When the connecting end of the computer host 14 is coupled to the connecting end 15 of the I/O board 13, current flows from the main power 11 to the computer host 14 via the I/O board 13, the connecting end 15 and the connecting end 16 sequentially. When the main power malfunctions and fails to supply power, the backup power 12 can still provide power to the computer host 14. However, in the prior art computer system 10, the connecting ends 15 and 16 can only provide a one-way current path. Therefore, the backup power 12 cannot supply power to the I/O board 13 via the connecting ends 15 and 16. As a result, a user cannot access data stored in the I/O board 13 from the computer host 14 when the main power 11 breaks down. In addition, the pin number of the connecting ends is limited. If a part of the pins provide a current path in a certain direction, and the other part of the pins provide a current path in another direction, the amount of current is not enough due to the insufficient number of pins.

SUMMARY OF THE INVENTION

It is therefore a primary objective of the claimed invention to provide a computer system and a related control device in order to solve the problems of the prior art.

The claimed invention provides a control device which controls power supply based on a power status comprising: a first switch; a second switch having a first end coupled to a first end of the first switch and a second end coupled to a computer host; a third switch having a first end coupled to the computer host and a second end coupled to a backup power; a fourth switch having a first end coupled to a second end of the first switch and a second end coupled to the second end of the third switch; a charging switch coupled to control ends of the second and third switches for controlling the second and third switches; and a judging circuit having a first input end for detecting a power status of a main power, a second input end for detecting a coupling status between the second input end and an I/O board, and an output end coupled to control ends of the first and fourth switches for controlling the first and fourth switches based on input signals received by the second input end of the judging circuit.

The claimed invention further provides a computer system which controls power supply based on a power status comprising: a main power; an I/O board coupled to the main power and including a connecting end; a backup power; a computer host; and a control device coupled to the backup power and including a connecting end coupled to the connecting end of the I/O board, the control device comprising: a first switch; a second switch having a first end coupled to a first end of the first switch and a second end coupled to the computer host; a third switch having a first end coupled to the computer host and a second end coupled to the backup power; a fourth switch having a first end coupled to a second end of the first switch and a second end coupled to the second end of the third switch; a charging switch coupled to control ends of the second and third switches for controlling the second and third switches; and a judging circuit having a first input end for detecting a power status of a main power, a second input end for detecting a coupling status of the second input end and the I/O board and an output end coupled to control ends of the first and fourth switches for controlling the first and fourth switches based on input signals received by the second input end of the judging circuit.

The claimed invention further provides a method for transmitting signals based on controlling power supply of a control device, the control device comprising: a first switch; a second switch having a first end coupled to a first end of the first switch and a second end coupled to a computer host; a third switch having a first end coupled to the computer host and a second end coupled to a backup power; a fourth switch having a first end coupled to a second end of the first switch and a second end coupled to the second end of the third switch; a charging switch coupled to control ends of the second and third switches for controlling the second and third switches; and a judging circuit having a first input end for detecting a power status of a main power, a second input end for detecting a coupling status between the second input end and an I/O board, and an output end coupled to control ends of the first and fourth switches for controlling the first and fourth switches based on input signals received by the second input end of the judging circuit. The method comprises checking signals of the first and second input ends of the judging circuit; controlling the first and fourth switches based on input signals received by the first and second input ends of the judging circuit; detecting a current direction of the control device; and controlling the second and third switches based on the current direction.

The claimed invention further provides a method for detecting interrupted signals based on controlling power supply of a judging circuit, the judging circuit comprising: a first input end for detecting a power status of a main power; a second input end for detecting a coupling status between the second input end and an I/O board; a third input end for receiving a reset signal; an output end for controlling two switches based on input signals received by the first and second input ends; a NAND gate for performing NAND operations on the first and second input ends; and a digital logic device for performing input end, and for outputting a signal to the output end. The method comprises checking signals of the first input end of the judging circuit; checking signals of the second input end of the judging circuit; controlling the two switches based on input signals received by the first and second input ends of the judging circuit; checking signals of the first input end of the judging circuit; and controlling the third input end for sending a reset signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
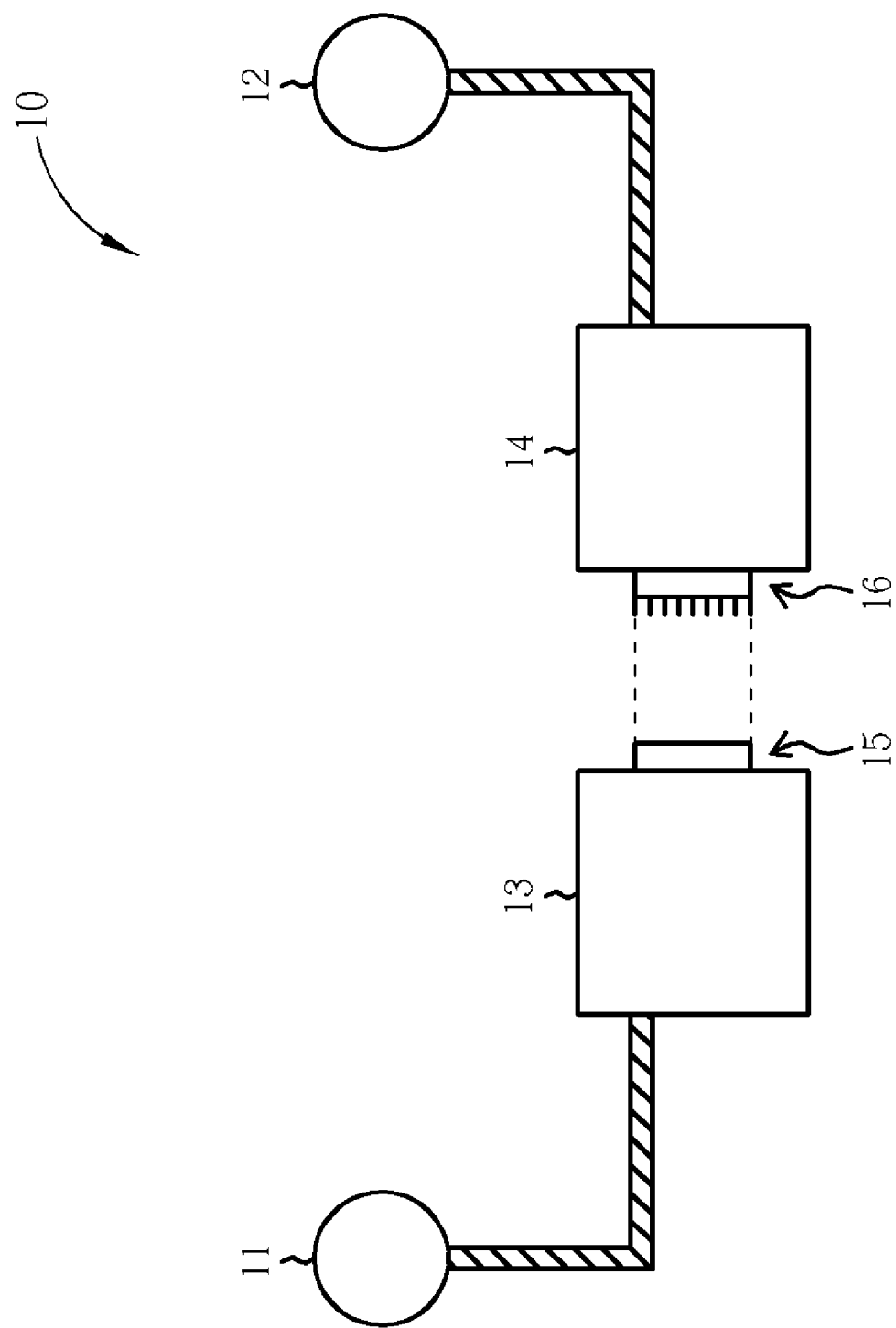
FIG. 1 is a diagram of a prior art computer system including a power supply.
Figure 2:
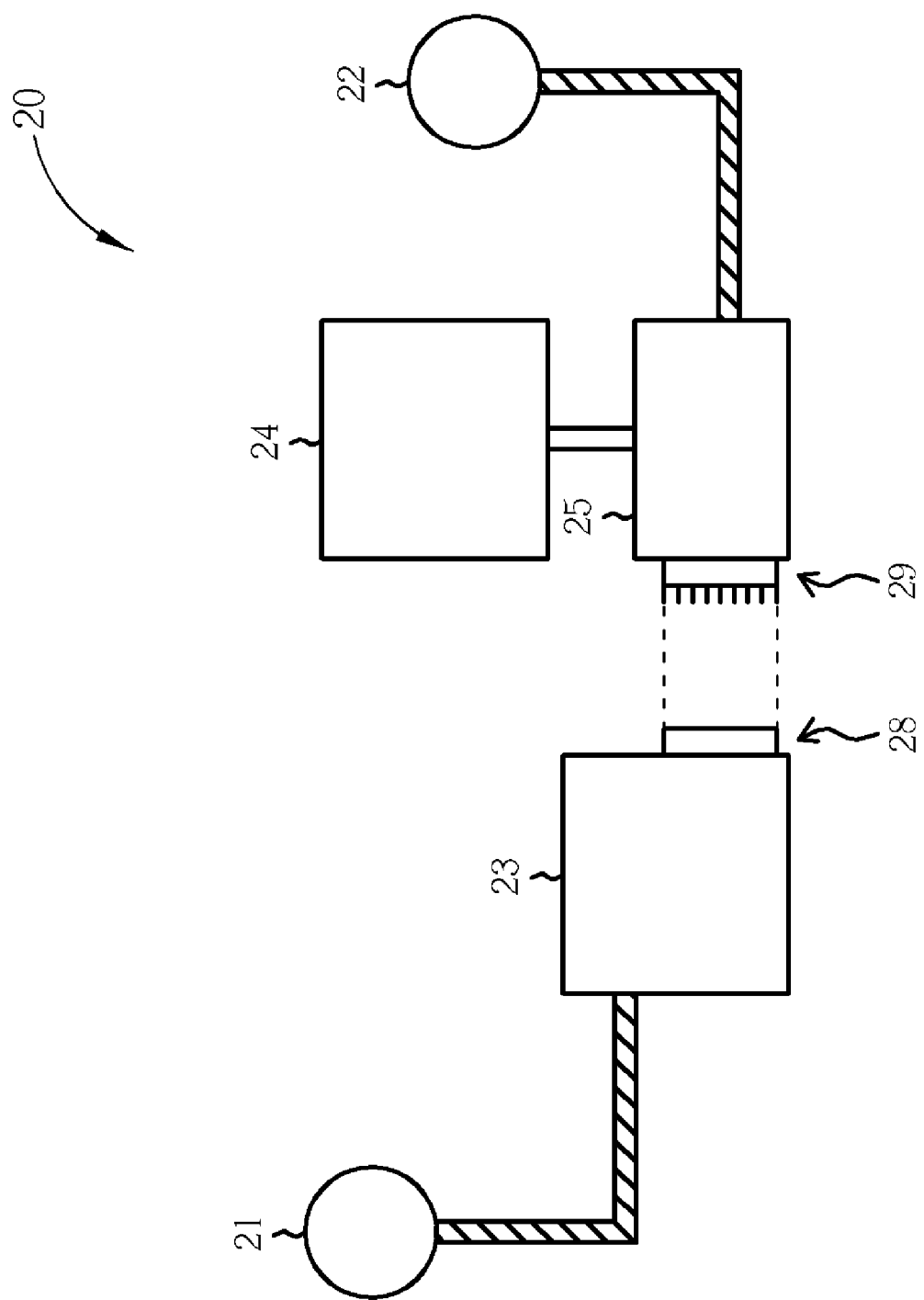
FIG. 2 is a functional block of a computer system including a power supply according to a preferred embodiment of the present invention.

Please refer to FIG. 2 for a functional block of a computer system 20 including a power supply according to a preferred embodiment of the present invention. The computer system 20 includes a main power 21, a backup power 22, an I/O board 23, a computer host 24 and a control device 25. The I/O board 23 is coupled to the main power 21 and includes a connecting end 28. The control device 25 is coupled to the backup power 22 and includes a connecting end 29 coupled to the connecting end 28 of the I/O board 23. The computer host 24 can be a notebook computer host, or other electronic devices. The computer host 24 is coupled to the control device 25 and coupled to the backup power 22 via the control device 25. When the connecting end 29 of the control device 25 is electrically isolated from the connecting end 28 of the I/O board 23, the backup power 22 supplies power to the computer host 24, and the main power 21 supplies power to the I/O board 23. When the connecting end 29 of the control device 25 is coupled to the connecting end 28 of the I/O board 23, the main power 21 supplies power to the I/O board 23 and to the computer host 24 through the connecting ends 28 and 29.

Under normal operation, when the connecting end 29 of the control device 25 is coupled to the connecting end 28 of the I/O board 23, the main power 21 and the backup power 22 do not supply power simultaneously, but either the main power 21 or the backup power 22 has to provide sufficient current for the computer host 24 and the I/O board 23. The control device 25 controls current directions by detecting a power status of the main power 21 and a coupling status between the connecting end 29 of the control device 25 and the connecting end 28 of the I/O board 23. If the connecting end 29 of the control device 25 is coupled to the connecting end 28 of the I/O board 23 and the main power 21 supplies power steadily, the control device 25 provides a first current path that allows current to flow from the main power 21 to the computer host 24 via the I/O board 23. The first current path includes the main power 21, the I/O board 23, the connecting end 28, the connecting end 29, the control device 25, and the computer host 24 sequentially. When the main power 21 is cut off, the control device 25 shuts down the first current path and activates the backup power 22. The control device 25 not only provides a second current path from the backup power 22 directly to the computer host 24, but also a third current path from the backup power 22 to the I/O board 23 via the control device 25. The third current path includes the backup power 22, the control device 25, the connecting end 29, the connecting end 28, and the I/O board 23 sequentially. Also, when the main power 21 resumes supplying power, the computer system 20 again operates based on the main power 21. Thus, the control device 25 shuts down the backup power 22 and restores the first current path, allowing current to flow from the main power 21 to the computer host 24 via the I/O board 23. The connecting ends have a fixed number of pins for providing bi-directional current flow, which means the current can flow from the backup power 22 to the I/O board 23 via the control device 25, or from the main power 21 to the computer host 24 via the I/O board 23 and the control device 25.

Figure 3:
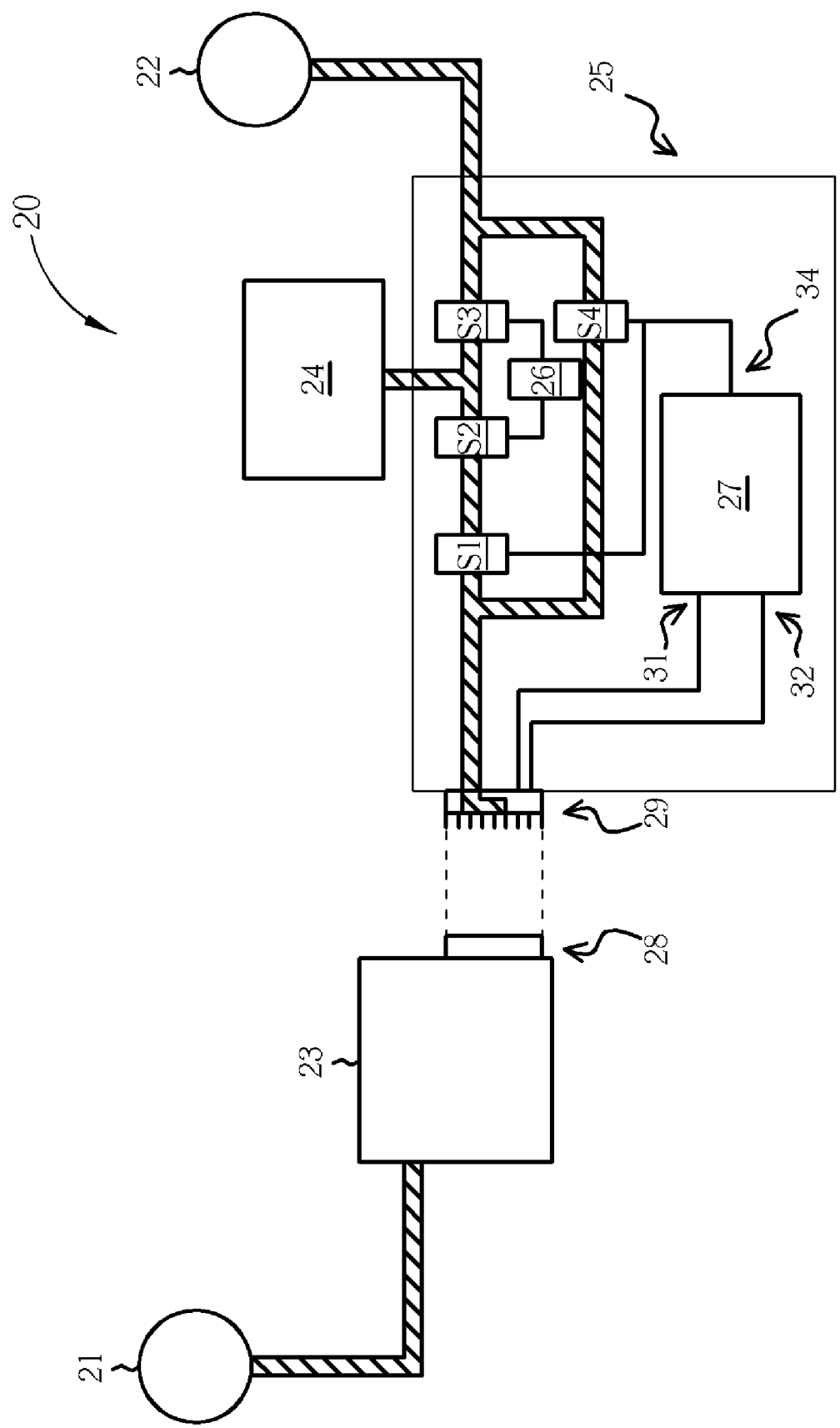
FIG. 3 is a diagram of the computer system in FIG. 2 and a corresponding control device.

Please refer to FIG. 3 for a diagram of the computer system 20 and the control device 25. The control device 25 includes a first switch S1, a second switch S2, a third switch S3, a fourth switch S4, a charging switch 26 and a judging circuit 27. The second switch S2 includes a first end coupled to a first end of the first switch S1 and a second end coupled to the computer host 24. The third switch S3 includes a first end coupled to the computer host 24 and a second end coupled to the backup power 22. The fourth switch S4 includes a first end coupled to a second end of the first switch S1 and a second end coupled to the second end of the third switch S3. The charging switch 26 is coupled to control ends of the second switch S2 and the third switch S3 for controlling the second switch S2 and the third switch S3. The judging circuit 27 includes a first input end 31 for detecting the power status of the main power 21, a second input end 32 for detecting the coupling status between the I/O board 23 and the second input end 32, and an output end 34 coupled to control ends of the first switch S1 and the fourth switch S4 for controlling the first switch S1 and the fourth switch S4 based on input signals received by the input ends 31 and 32 of the judging circuit 27.

In FIG. 3, the charging switch 26 includes a detecting chip coupled to the control ends of the second switch S2 and the third switch S3 for detecting current directions and for controlling the second switch S2 and the third switch S3 based on the current directions detected by the detecting chip. If the connecting end 29 of the control device 25 is coupled to the connecting end 28 of the I/O board 23 and the main power 21 supplies power steadily, the charging switch 26 turns on the second switch S2 and turns off the third switch S3, and the judging circuit 27 turns on the first switch S1 and turns off the fourth switch S4. Therefore, the main power 21 provides current to the I/O board 23 and supplies power to the computer host 24 through the current path that includes the connecting ends 28 and 29, the turned-on first switch S1 and the turned-on second switch S2. When the main power 21 shuts down, the charging switch 26 turns off the second switch S2 and turns on the third switch S3, and the judging circuit 27 turns off the first switch S1 and turns on the fourth switch S4. Therefore, the backup power 22 provides power to the computer host 24 through the turned-on third switch S3 and to the I/O board 23 through the turned-on fourth switch S4.

The connecting end 29 of the control device 25 and the connecting end 28 of the I/O board 23 provide access to a bi-directional channel. The bi-directional channel includes a fixed number of pins for providing bi-directional current, such as the current flowing from the main power 21 to the computer host 24 via the I/O board 23, or the current flowing from the backup power 22 to the I/O board 23 via the control device 25.

Figure 4:
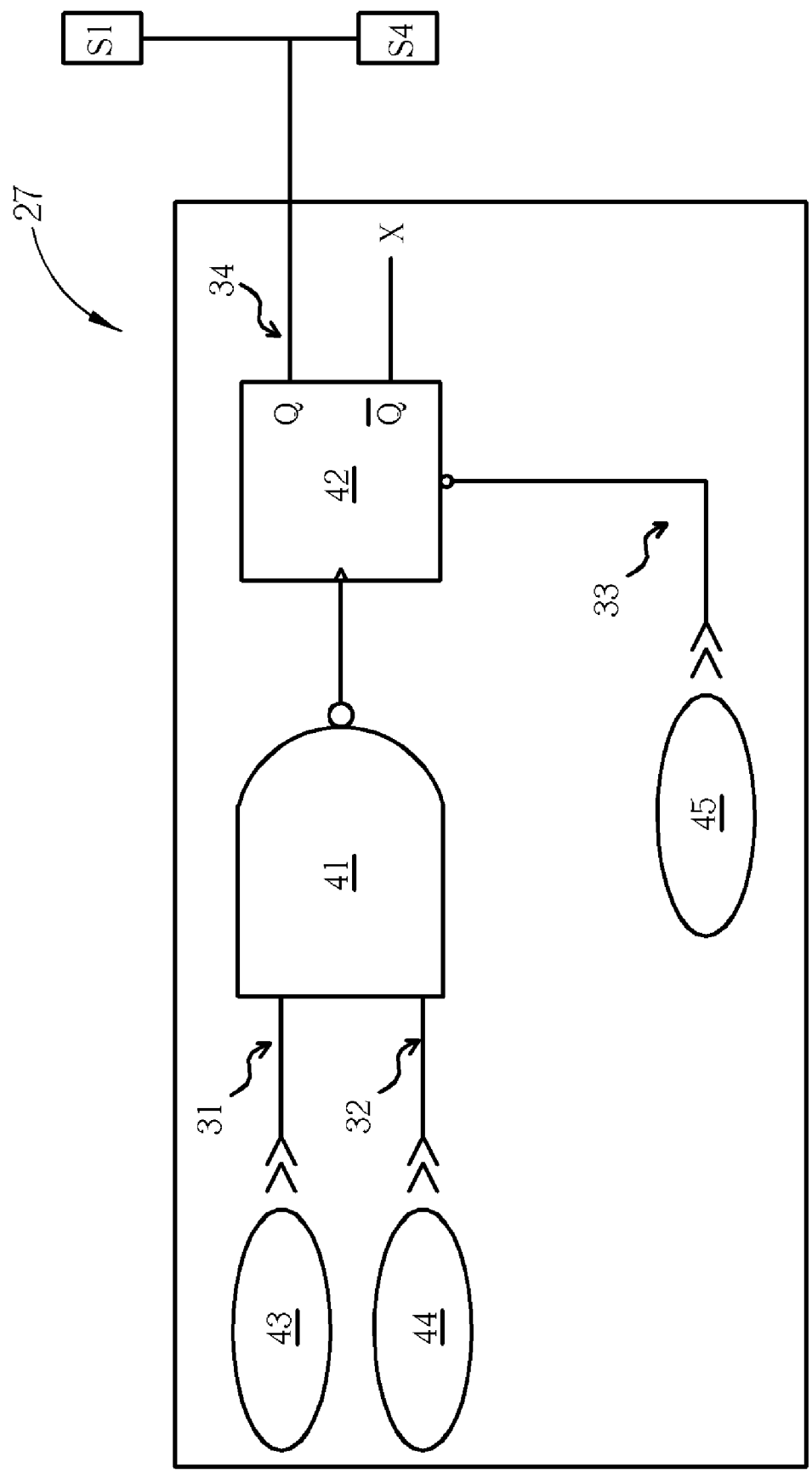
FIG. 4 is a diagram of a judging circuit.

Please refer to FIG. 4 for a diagram of the judging circuit 27. The judging circuit 27 includes a NAND gate 41 and a digital logic unit 42. As mentioned before, the first input end 31 of the judging circuit 27 detects a power status signal 43 of the main power 21, and the second input end 32 of the judging circuit 27 detects a connection status signal 44 between the connecting ends 28 and 29. The judging circuit 27 further includes a third input end 33 for receiving a reset signal 45. The power status signal 43 can be represented by an input signal having logic high/low levels. For example, when the voltage of the main power 21 drops, the original input signal of high logic level changes to low logic level. The connection status signal 44 depends on whether the connecting ends 28 and 29 are electrically connected. If the connecting ends 28 and 29 are electrically connected, the connection status signal 44 of high logic level is sent to the judging circuit 27. When the main power 21 resumes supplying power to the computer system 20, the judging circuit 27 sends the reset signal 45 for turning on the first switch S1 and for shutting down the backup power 22 by turning off the fourth switch S4.

If the connecting ends 28 and 29 are electrically connected and the main power 21 supplies power steadily, the output of the NAND gate 41 has logic low level. At the same time, an output end 34 of the digital logic unit 42 turns off the fourth switch S4 and turns on the first switch S1. When the power status signal 43 and the connection status signal 44 have logic low level, either the connection ends 28 and 29 are not electrically connected, or the main power 21 cannot supply power. At the same time, the output of the NAND gate 41 changes from low level to high level. With the fourth switch S4 being turned on and first switch S1 being turned off by the signal generated at the output end of the digital logic device 42, the backup power begins to supply power. When the main power 21 resumes supplying power, the judging circuit 27 sends the reset signal 45 for turning off the fourth switch S4 and turning on the first switch S1.

Figure 5:
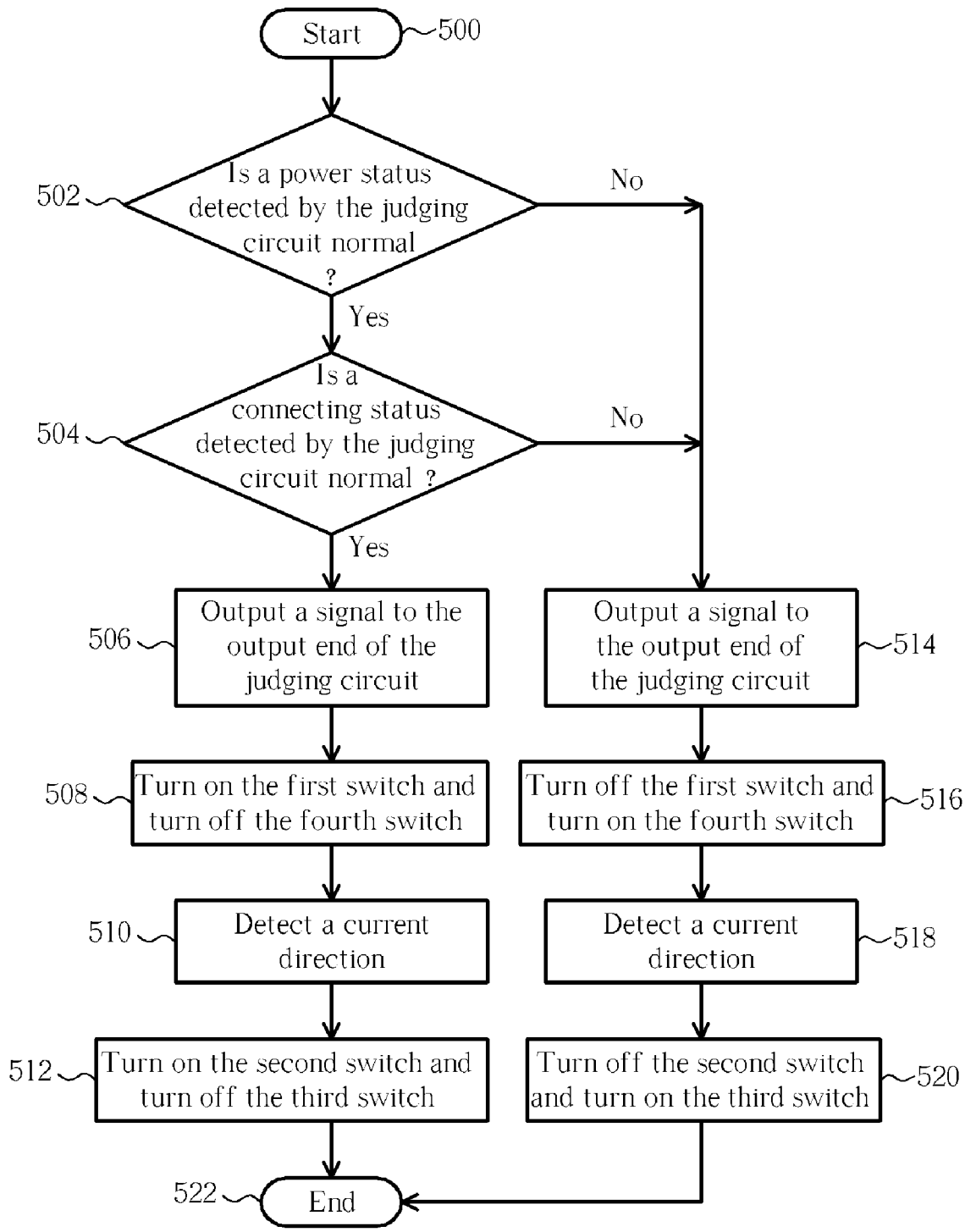
FIG. 5 is a flowchart illustrating a signal-transmitting method according to the present invention.

Please refer to FIG. 5 for a flowchart illustrating a signal-transmitting method of the control device 25. The signal-transmitting method includes the following steps:

Step 500: start; execute step 502;

Step 502: determine whether a power status detected by the first input end 31 of the judging circuit 27 is normal; if the power status is normal, execute step 504; if the power status is not normal, execute step 514;

Step 504: determine whether a connecting status detected by the second input end 32 of the judging circuit 27 is normal; if the connecting status is normal, execute step 506; if the connecting status is not normal, execute step 514;

Step 506: output a signal to the output end 34 based on results of the first input end 31 and the second input end 32 of the judging circuit 27; execute step 508;

Step 508: turn on the first switch S1 and turn off the fourth switch S4; execute step 510;

Step 510: detect a current direction; execute step 512;

Step 512: turn on the second switch S2 and turn off the third switch S3; execute step 522;

Step 514: output a signal to the output end 34 based on results of the first input end 31 and the second input end 32 of the judging circuit 27; execute step 516;

Step 516: turn off the first switch S1 and turn on the fourth switch S4; execute step 518;

Step 518: detect a current direction; execute step 520;

Step 520: turn off the second switch S2 and turn on the third switch S3; execute step 522;

Step 522: end.

Figure 6:
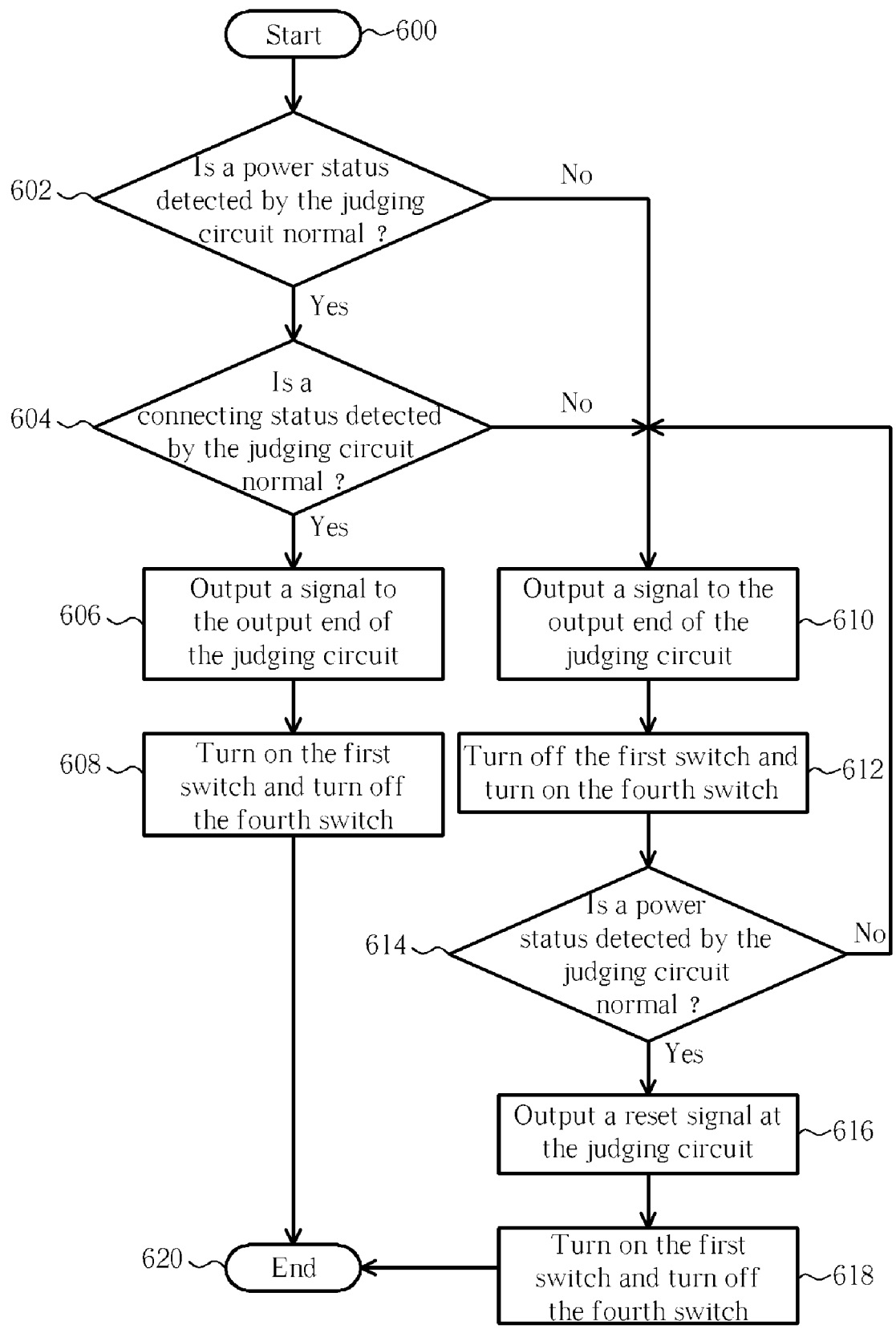
FIG. 6 is a flowchart illustrating a method of detecting interrupted signals according to the present invention.

Please refer to FIG. 6 for a flowchart illustrating a method of detecting interrupted signals using the judging circuit 27. The method of detecting interrupted signals includes the following steps:

Step 600: start; execute step 602;

Step 602: determine whether a power status detected by the first input end 31 of the judging circuit 27 is normal; if the power status is normal, execute step 604; if the power status is not normal, execute step 610;

Step 604: determine whether a connecting status detected by the second input end 32 of the judging circuit 27 is normal; if the connecting status is normal, execute step 606; if the connecting status is not normal, execute step 610;

Step 606: output a signal to the output end 34 based on results of the first input end 31 and the second input end 32 of the judging circuit 27; execute step 608;

Step 608: turn on the first switch S1 and turn off the fourth switch S4; execute step 620;

Step 610: output a signal to the output end 34 based on results of the first input end 31 and the second input end 32 of the judging circuit 27; execute step 612;

Step 612: turn off the first switch S1 and turn on the fourth switch S4; execute step 614;

Step 614: determine whether a power status detected by the first input end 31 of the judging circuit 27 is normal; if the power status is normal, execute step 616; if the power status is not normal, execute step 610;

Step 616: output a reset signal at the third input end 33 of the judging circuit 27; execute step 618;

Step 618: turn on the first switch S1 and turn off the fourth switch S4; execute step 620;

Step 620: end.

The above-mentioned embodiments illustrate but do not limit the present invention. The switches S1-S4 can be metal-oxide semiconductor field-effect transistors (MOSFETs), or other devices providing similar functions. The judging circuit 27 adopts the NAND gate 41 and the digital logic device 42, but it can also adopt other devices.

In conclusion, the present invention provides a computer system and related control device which controls power supply based on a power status. When the main power 21 shuts down, the control device 25 detects the malfunction and activates the backup power 22 in order to avoid data loss. Also, the control device 25 provides a bi-directional current path using the switches S1-S4, allowing power to be supplied to the I/O board 23 from the backup power 22 when the main power 21 malfunctions. Therefore, data can still be accessed even if the main power 21 fails to supply power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control device which controls power supply based on a power status comprising:
   a first switch;
   a second switch having a first end coupled to a first end of the first switch and a second end coupled to a computer host;
   a third switch having a first end coupled to the computer host and a second end coupled to a backup power;

a fourth switch having a first end coupled to a second end of the first switch and a second end coupled to the second end of the third switch;

a charging switch coupled to control ends of the second and third switches for controlling the second and third switches; and a judging circuit having a first input end for detecting a power status of a main power, a second input end for detecting a coupling status between the second input end and an I/O board, and an output end coupled to control ends of the first and fourth switches for controlling the first and fourth switches based on input signals received by the second input end of the judging circuit.

2. The control device of claim 1 wherein each of the first through fourth switches includes a metal-oxide semiconductor field-effect transistor (MOSFET).

3. The control device of claim 1 wherein the charging switch includes a detecting chip for detecting current directions and two control ends for controlling the second and third switches based on the current directions detected by the detecting chip.

4. The control device of claim 1 wherein the computer host includes a notebook computer host, a personal digital assistant, a pocket computer, a tablet computer host, or a handhold computer host.

5. A computer system which controls power supply based on a power status comprising:
a main power;
an I/O board coupled to the main power and including a connecting end;
a backup power;
a computer host; and
a control device coupled to the backup power and including a connecting end coupled to the connecting end of the I/O board, the control device comprising:
a first switch;
a second switch having a first end coupled to a first end of the first switch and a second end coupled to the computer host;
a third switch having a first end coupled to the computer host and a second end coupled to the backup power;
a fourth switch having a first end coupled to a second end of the first switch and a second end coupled to the second end of the third switch;
a charging switch coupled to control ends of the second and third switches for controlling the second and third switches; and
a judging circuit having a first input end for detecting a power status of a main power, a second input end for detecting a coupling status of the second input end and the I/O board and an output end coupled to control ends of the first and fourth switches for controlling the first and fourth switches based on input signals received by the second input end of the judging circuit.

6. The computer system of claim 5 wherein each of the first through fourth switches includes a metal-oxide semiconductor field-effect transistor.

7. The computer system of claim 5 wherein the charging switch includes a detecting chip for detecting current directions and two control ends for controlling the second and third switches based on the current directions detected by the detecting chip.

8. The computer system of claim 5 wherein the computer host includes a notebook computer host, a personal digital assistant, a pocket computer, a tablet computer host, or a handhold computer host.

9. The computer system of claim 5 wherein the backup power includes an adaptor or a battery.

10. The computer system of claim 5 wherein the main power includes a battery, an adaptor, or a car storage battery.

11. A method for transmitting signals based on controlling power supply of a control device, the control device comprising:
a first switch;
a second switch having a first end coupled to a first end of the first switch and a second end coupled to a computer host;
a third switch having a first end coupled to the computer host and a second end coupled to a backup power;
a fourth switch having a first end coupled to a second end of the first switch and a second end coupled to the second end of the third switch;
a charging switch coupled to control ends of the second and third switches for controlling the second and third switches; and
a judging circuit having a first input end for detecting a power status of a main power, a second input end for detecting a coupling status between the second input end and an I/O board, and an output end coupled to control ends of the first and fourth switches for controlling the first and fourth switches based on input signals received by the second input end of the judging circuit;

the method comprising:
checking signals of the first and second input ends of the judging circuit;
controlling the first and fourth switches based on input signals received by the first and second input ends of the judging circuit;
detecting a current direction of the control device; and
controlling the second and third switches based on the current direction.

12. A method for detecting interrupted signals based on controlling power supply of a judging circuit, the judging circuit comprising:
a first input end for detecting a power status of a main power;
a second input end for detecting a coupling status between the second input end and an I/O board;
a third input end for receiving a reset signal;
an output end for controlling two switches based on input signals received by the first and second input ends;
a NAND gate for performing NAND operations on the first and second input ends; and
a digital logic device for performing digital logic operations based on output signals of the NAND gate and signals of the third input end, and for outputting a signal to the output end;

the method comprising:
checking signals of the first input end of the judging circuit;
checking signals of the second input end of the judging circuit;
controlling the two switches based on input signals received by the first and second input ends of the judging circuit;
checking signals of the first input end of the judging circuit; and
controlling the third input end for sending a reset signal.

* * * * *